US010589731B2

(12) United States Patent
Iwamoto et al.

(10) Patent No.: US 10,589,731 B2
(45) Date of Patent: Mar. 17, 2020

(54) SAILING STOP CONTROL METHOD AND CONTROL DEVICE FOR VEHICLE

(71) Applicants: NISSAN MOTOR CO., LTD., Kanagawa (JP); JATCO Ltd, Shizuoka (JP)

(72) Inventors: Tadashi Iwamoto, Kanagawa (JP); Masayoshi Nakasaki, Kanagawa (JP); Yoshimasa Nishihiro, Kanagawa (JP); Yukifumi Ootsuka, Kanagawa (JP)

(73) Assignees: Nissan Motor Co., Ltd., Kanagawa (JP); JATCO Ltd, Shizuoka (JP)

( * ) Notice: Subject to any disclaimer, the term of this patent is extended or adjusted under 35 U.S.C. 154(b) by 0 days.

(21) Appl. No.: 16/072,468

(22) PCT Filed: Jan. 17, 2017

(86) PCT No.: PCT/JP2017/001296
§ 371 (c)(1),
(2) Date: Jul. 24, 2018

(87) PCT Pub. No.: WO2017/130779
PCT Pub. Date: Aug. 3, 2017

(65) Prior Publication Data
US 2019/0031171 A1    Jan. 31, 2019

(30) Foreign Application Priority Data
Jan. 25, 2016 (JP) ................. 2016-011346

(51) Int. Cl.
*B60W 10/02* (2006.01)
*B60W 10/06* (2006.01)
(Continued)

(52) U.S. Cl.
CPC ............ *B60W 10/02* (2013.01); *B60W 10/06* (2013.01); *B60W 10/107* (2013.01);
(Continued)

(58) Field of Classification Search
CPC ............... B60W 10/02; B60W 30/182; B60W 30/18072; B60W 10/107; B60W 10/06;
(Continued)

(56) References Cited

U.S. PATENT DOCUMENTS 10,173,683 B2 * 1/2019 Iwamoto ............... B60W 10/02
2015/0274168 A1 * 10/2015 Kuroki ................ B60W 10/184
701/70
(Continued)

FOREIGN PATENT DOCUMENTS

JP    H07-266932 A    10/1995
JP    2002-180873 A    6/2002
(Continued)

*Primary Examiner* — David J Hlavka
(74) *Attorney, Agent, or Firm* — Osha Liang LLP (57) ABSTRACT

A sailing stop control method for a vehicle including a transmission and a friction engaging element in series between an engine and drive wheels includes performing a sailing stop control to coast by shutting off power transmission by the friction engaging element, stopping the engine based on satisfaction of a sailing enter condition, restarting the engine upon satisfaction of a sailing exit condition during coasting by the sailing stop control, executing a shift control to set a target speed ratio of the transmission to a highest speed ratio smaller than a coasting speed ratio in normal time and satisfying engine exhaust performance after the restart of the engine if the sailing exit condition is a brake pedal depressing operation, and re-engaging the friction engaging element, if input and output revolution speeds of the friction engaging element are determined to be a synchronous revolution speed after end of the shift control.

4 Claims, 6 Drawing Sheets

(51) Int. Cl.
  *B60W 10/107* (2012.01)
  *F02D 17/00* (2006.01)
  *F02D 29/02* (2006.01)
  *B60W 30/18* (2012.01)
  *F16H 61/02* (2006.01)
  *B60W 30/182* (2020.01)

(52) U.S. Cl.
  CPC .... *B60W 30/182* (2013.01); *B60W 30/18072* (2013.01); *F02D 17/00* (2013.01); *F02D 29/02* (2013.01); *F16H 61/02* (2013.01); *F16H 61/0276* (2013.01); *B60W 2030/1809* (2013.01); *B60W 2540/10* (2013.01); *B60W 2540/106* (2013.01); *B60W 2540/12* (2013.01); *B60W 2710/0644* (2013.01); *B60W 2710/1005* (2013.01); *Y02T 10/52* (2013.01); *Y02T 10/76* (2013.01)

(58) Field of Classification Search
  CPC . B60W 2710/1005; B60W 2710/0644; B60W 2540/12; B60W 2540/106; B60W 2540/10; B60W 2030/1809; F16H 61/0276; F16H 61/02; F02D 29/02; F02D 17/00; Y02T 10/52; Y02T 10/76
  See application file for complete search history.

(56) References Cited

U.S. PATENT DOCUMENTS

| | | | |
|---|---|---|---|
| 2015/0291165 A1* | 10/2015 | Mitsuyasu | B60W 30/18172 701/54 |
| 2015/0291171 A1* | 10/2015 | Kuroki | F02D 41/12 701/70 |

FOREIGN PATENT DOCUMENTS

| | | |
|---|---|---|
| JP | 2014-084960 A | 5/2014 |
| WO | 2014/068726 A1 | 5/2014 |

* cited by examiner

SAILING STOP CONTROL METHOD AND CONTROL DEVICE FOR VEHICLE

CROSS-REFERENCE TO RELATED APPLICATIONS

The present application claims priority to Japanese Patent Application No. 2016-011346 filed with the Japan Patent Office on Jan. 25, 2016, the contents of which are hereby incorporated by reference in their entirety.

BACKGROUND

Technical Field

The present invention relates to sailing stop control method and control device for vehicle configured to coast by shutting off power transmission from an engine to drive wheels and stopping the engine.

Related Art

Conventionally, an engine automatic start/stop device is known which causes a vehicle to coast by a sailing stop control by automatically stopping an engine and setting a starting clutch in an uncoupled state at the time of deceleration in which only a minute torque is required during the travel of the vehicle (see, for example, patent literature 1).

CITATION LIST

Patent Literature

Patent literature 1: JP H07-266932A

SUMMARY OF INVENTION

However, in the conventional device, rotation synchronization is performed to alleviate a shock at the time of engaging a forward clutch in a scene where the engine is restarted to return from coasting with the engine stopped. The engine performs this rotation synchronization at a fully open torque to suppress response deterioration to a minimum level, but deteriorating of engine exhaust may occur.

According to one or more embodiments of the present invention, a sailing stop control method and control device for vehicle may shorten a lag time until an initial acceleration/deceleration is reached, while reducing the deterioration of engine exhaust when return is made after a sailing exit condition is satisfied.

One or more embodiments of the present invention includes a transmission and a friction engaging element arranged in series between an engine and drive wheels and executes a sailing stop control to coast by shutting off power transmission by the friction engaging element and stopping the engine on the basis of satisfaction of a sailing enter condition.

In this vehicle, the engine is restarted upon satisfaction of a sailing exit condition during coasting by the sailing stop control.

If the sailing condition is a brake pedal depressing operation, a shift control is executed to set a target speed ratio of the transmission to a highest speed ratio smaller than a coasting speed ratio in normal time and satisfying engine exhaust performance after the restart of the engine.

The friction engaging element is re-engaged if input and output revolution speeds of the friction engaging element are determined to be a synchronous revolution speed after the end of the shift control of the transmission.

If the sailing exit condition is satisfied by the brake pedal depressing operation during coasting by the sailing stop control and the engine is restarted, the shift control is executed to set the target speed ratio of the transmission to the highest speed ratio smaller than a coasting speed ratio in normal time and satisfying exhaust performance before rotation synchronization of the friction engaging element.

Specifically, a shift in an up-shifting direction to set the speed ratio smaller than the coasting speed ratio is a shift to reduce the input revolution speed of the transmission if the output revolution speed of the transmission is constant. Thus, at a timing at which an engine revolution speed of the engine arranged at an input side of the transmission increases to a revolution speed lower than that at the coasting speed ratio, the input and output revolution speeds of the friction engaging element are determined to be the synchronous revolution speed. Therefore, engine exhaust deterioration (exhaust amount of HC) is reduced by decreasing an intake air amount of the engine restarted upon satisfaction of the sailing exit condition. In addition, since the engine revolution speed at which the friction engaging element reaches the synchronous revolution speed is the revolution speed lower than that at the coasting speed ratio, the friction engaging element is re-engaged at an earlier timing and a lag time (response) until an initial acceleration/deceleration is reached is shortened.

As a result, the lag time until the initial acceleration/deceleration is reached can be shortened while the deterioration of engine exhaust is reduced when return is made after the sailing exit condition is satisfied. In addition, if the sailing exit condition is satisfied by the brake pedal depressing operation, the engine exhaust performance for reducing an engine displacement can be satisfied.

DETAILED DESCRIPTION

Hereinafter, a sailing stop control method and a control device for vehicle according to embodiments of the present invention are described with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First, a configuration is described.

The sailing stop control method and control device according to one or more embodiments of the present invention are applied to an engine vehicle mounted with a continuously variable transmission equipped with a sub-transmission. The configuration of the sailing stop control device of the engine vehicle according to one or more embodiments of the present invention is described separately for an "overall system configuration", a "shift control configuration by a shift map" and a "sailing stop control process configuration".

[Overall System Configuration]

Figure 1:
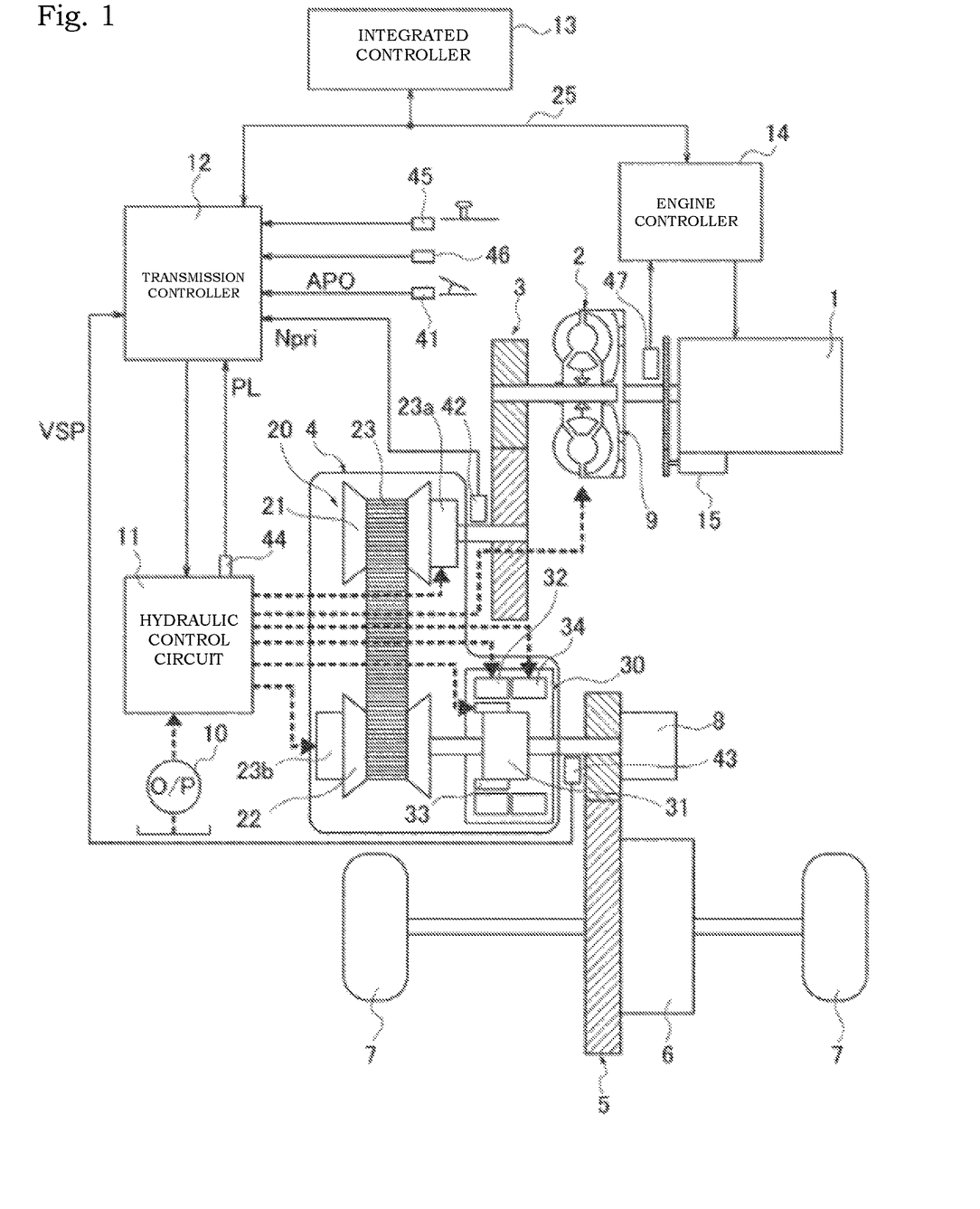
FIG. 1 is an overall configuration diagram of an engine vehicle mounted with a continuously variable transmission equipped with a sub-transmission to which sailing stop control method and control device according to one or more embodiments of the present invention are applied.
Figure 2:
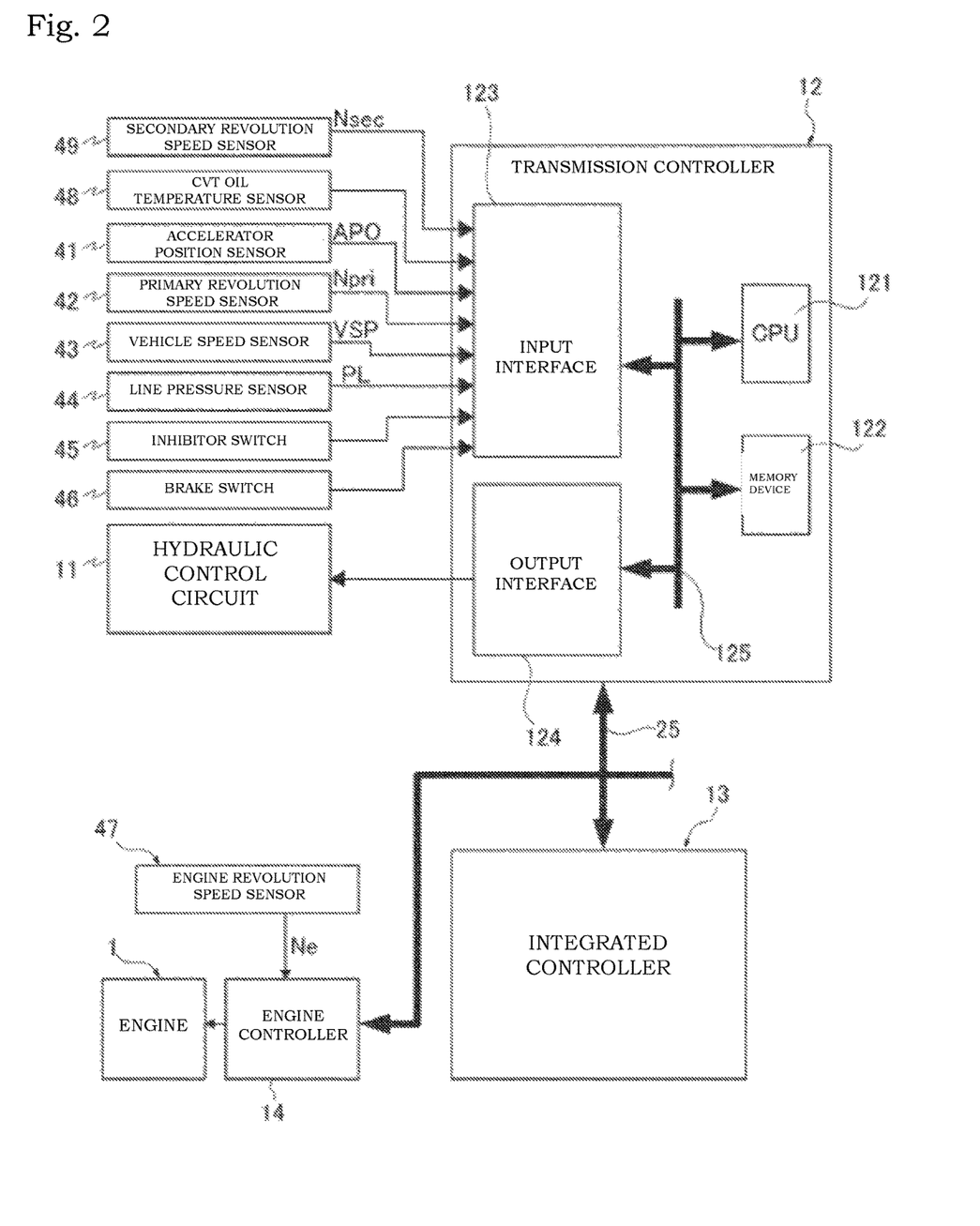
FIG. 2 is a block diagram showing a control system configuration of the continuously variable transmission equipped with the sub-transmission to which sailing stop control method and control device according to one or more embodiments of the present invention are applied.

FIG. 1 shows an overall configuration of the engine vehicle mounted with the continuously variable transmission equipped with the sub-transmission to which the sailing stop control device according to one or more embodiments of the present invention is applied, and FIG. 2 shows the control system configuration. The overall system configuration is described on the basis of FIGS. 1 and 2 below. It should be noted that, in the following description, a "speed ratio" of a certain transmission mechanism is a value obtained by dividing an input revolution speed of this transmission mechanism by an output revolution speed of this transmission mechanism. Further, a "lowest speed ratio" means a maximum speed ratio of this transmission mechanism and a "highest speed ratio" means a minimum speed ratio of this transmission mechanism.

The engine vehicle shown in FIG. 1 includes an engine 1 having a starter motor 15 for engine start as a travel drive source. Output rotation of the engine 1 is transmitted to drive wheels 7 via a torque converter 2 including a lock-up clutch 9, a reduction gear pair 3, a continuously variable transmission 4 equipped with a sub-transmission (hereinafter, referred to as an "automatic transmission 4"), a final gear pair 5 and a final reduction gear 6. The final gear pair 5 is provided with a parking mechanism 8 for mechanically unrotatably locking an output shaft of the automatic transmission 4 in parking. A mechanical oil pump 10 to be driven by power of the engine 1 is provided as a hydraulic pressure source. There are provided a hydraulic control circuit 11 for adjusting a discharge pressure from the mechanical oil pump 10 and supplying the adjusted discharge pressure to each part of the automatic transmission 4, a transmission controller 12 for controlling the hydraulic control circuit 11, an integrated controller 13 and an engine controller 14. Each component is described below.

The automatic transmission 4 includes a belt continuously variable transmission (hereinafter, referred to as a "variator 20") and a sub-transmission mechanism 30 provided in series with the variator 20. Here, "provided in series" means that the variator 20 and the sub-transmission mechanism 30 are provided in series in a power transmission path. The sub-transmission mechanism 30 may be directly connected to an output shaft of the variator 20 as in this example or may be connected via another shift or power transmission mechanism (e.g. gear train).

The variator 20 is a belt continuously variable transmission mechanism with a primary pulley 21, a secondary pulley 22 and a V-belt 23 mounted between the pulleys 21 and 22. Each of the pulleys 21, 22 includes a fixed conical plate, a movable conical plate arranged with a sheave surface facing the fixed conical plate and forming a V groove between the fixed conical plate and the movable conical plate, and a primary hydraulic cylinder 23a and a secondary hydraulic cylinder 23b provided on the back surface of the movable conical plate and configured to displace the movable conical plate in an axial direction. If hydraulic pressures supplied to the primary hydraulic cylinder 23a and the secondary hydraulic cylinder 23b are adjusted, a width of the V groove changes to change a contact radius of each pulley 21, 22 with the V-belt 23, whereby a speed ratio of the variator 20 continuously changes.

The sub-transmission mechanism 30 is a transmission mechanism with two forward speeds and one reverse speed. The sub-transmission mechanism 30 includes a Ravigneaux-type planetary gear mechanism 31 in which carriers of two planetary gears are coupled, and a plurality of friction engaging elements (low brake 32, high clutch 33, reverse brake 34) which are connected to a plurality of rotation elements constituting the Ravigneaux-type planetary gear mechanism 31 to change coupled states of these rotation elements.

By adjusting a hydraulic pressure supplied to each friction engaging element 32 to 34 to change an engaged/disengaged state of each friction engaging element 32 to 34, a gear position of the sub-transmission mechanism 30 is changed. For example, the gear position of the sub-transmission mechanism 30 is set to a forward first gear position (hereinafter, referred to as a "low speed mode") by engaging the low brake 32 and disengaging the high clutch 33 and the reverse brake 34. The gear position of the sub-transmission mechanism 30 is set to a forward second gear position (hereinafter, referred to as a "high speed mode") having a smaller speed ratio than in the first gear position by engaging the high clutch 33 and disengaging the low brake 32 and the reverse brake 34. Further, the gear position of the sub-transmission mechanism 30 is set to a reverse gear position by engaging the reverse brake 34 and disengaging the low brake 32 and the high clutch 33. It should be noted that if the low brake 32, the high clutch 33 and the reverse brake 34 of the sub-transmission mechanism 30 are all disengaged, a drive force transmission path to the drive wheels 7 is shut off. It should be noted that the low brake 32 and the high clutch 33 are referred to as a "forward clutch Fwd/C" below.

The transmission controller 12 includes, as shown in FIG. 2, a CPU 121, a memory device 122 composed of a RAM and a ROM, an input interface 123, an output interface 124 and a bus 125 for connecting these components to each other. This transmission controller 12 controls the speed ratio of the variator 20 and achieves a predetermined gear position by switching the plurality of friction engaging elements (low brake 32, high clutch 33, reverse brake 34) of the sub-transmission mechanism 30.

To the input interface 123 are input an output signal of an accelerator position sensor 41 for detecting a depression opening of an accelerator pedal (hereinafter, referred to as an "accelerator position APO"), an output signal of a primary revolution speed sensor 42 for detecting an input revolution speed of the variator 20 (revolution speed of the primary pulley 21, hereinafter referred to as a "primary revolution speed Npri"), an output signal of a vehicle speed sensor 43 for detecting a traveling speed of the vehicle (hereinafter, referred to as a "vehicle speed VSP"), an output signal of a line pressure sensor 44 for detecting a line pressure of the automatic transmission 4 (hereinafter, referred to as a "line pressure PL"), an output signal of an inhibitor switch 45 for detecting the position of a select lever, an output signal of a brake switch 46 for detecting a state of a brake and the like. Further, an output signal of a CVT oil temperature sensor 48 for detecting a CVT oil temperature and an output signal of a revolution speed sensor 49 for detecting an output revolution speed of the variator 20 (=revolution speed of the secondary pulley 22, hereinafter referred to as a "secondary revolution speed Nsec") are input. It should be noted the vehicle speed VSP is the same as an output revolution speed Nout of the automatic transmission 4.

A shift control program of the automatic transmission 4 and a shift map (FIG. 3) used in this shift control program are stored in the memory device 122. The CPU 121 reads and executes the shift control program stored in the memory device 122, performs various computations on various signals input via the input interface 123 to generate a shift control signal, and outputs the generated shift control signal to the hydraulic control circuit 11 via the output interface 124. Various values used in the computations by the CPU 121 and computation results thereof are appropriately stored in the memory device 122.

The hydraulic control circuit 11 is composed of a plurality of flow passages and a plurality of hydraulic control valves. On the basis of a shift control signal from the controller 12, the hydraulic control circuit 11 controls the plurality of hydraulic control valves to switch hydraulic pressure supply paths. This is described in detail later.

The integrated controller 13 integratedly manages a plurality of in-vehicle controllers to properly ensure a transmission control by the transmission controller 12 and an engine control by the engine controller 14. This integrated controller 13 is connected to the in-vehicle controllers such as the transmission controller 12 and the engine controller 14 via a CAN communication line 25 so as to be able to exchange information. The integrated controller 13 executes a sailing stop control for stopping the engine 1 during coasting and the like.

The engine controller 14 executes an engine stop control due to a fuel cut to the engine 1, an engine start control for starting the engine 1 using the starter motor 15 and the like. An output signal of an engine revolution speed sensor 47 for detecting a revolution speed of the engine 1 (hereinafter, referred to as an "engine revolution speed Ne") and the like are input to the engine controller 14.

[Shift Control Configuration by Shift Map]

Figure 3:
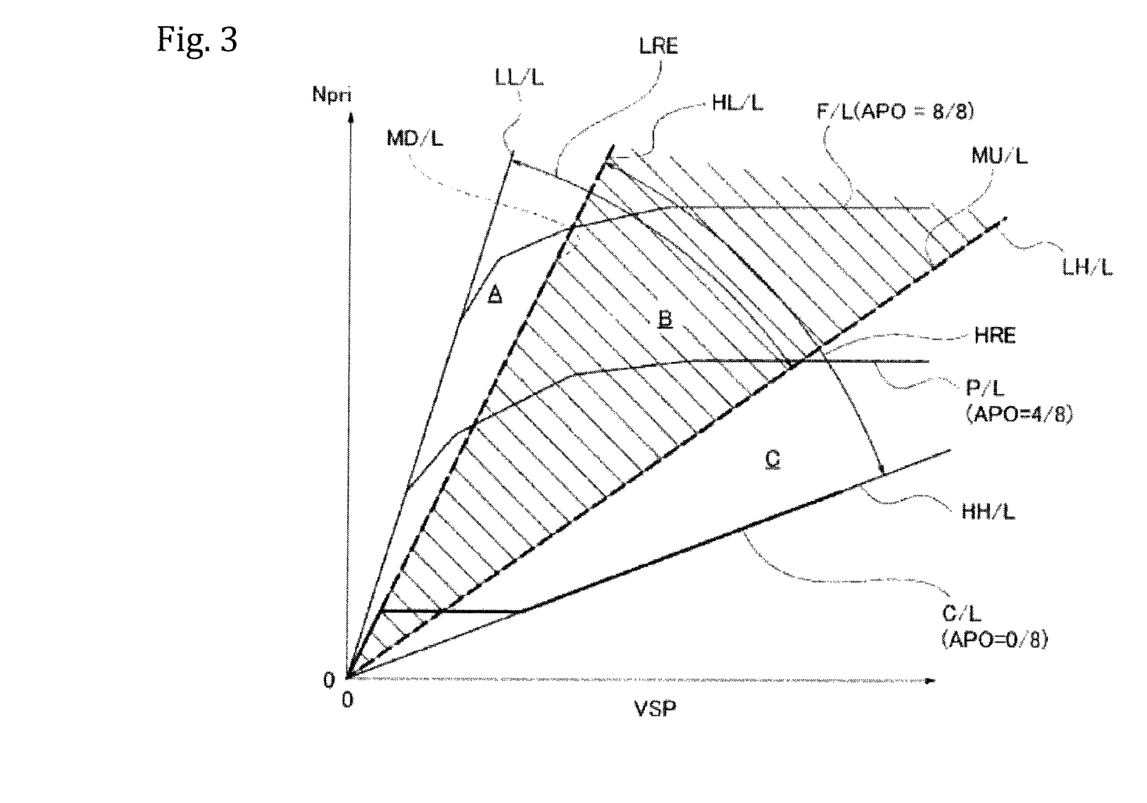
FIG. 3 is a shift map diagram showing an example of a shift map stored in a memory device of a transmission controller according to one or more embodiments of the present invention.

FIG. 3 shows an example of the shift map stored in the memory device of the transmission controller. The shift control configuration by the shift map is described on the basis of FIG. 3 below.

An operating point of the automatic transmission 4 is determined on the basis of the vehicle speed VSP and the primary revolution speed Npri on the shift map shown in FIG. 3. A gradient of a line connecting the operating point of the automatic transmission 4 and a zero point on a left-lower corner of the shift map represents a speed ratio of the automatic transmission 4 (overall speed ratio obtained by multiplying a speed ratio vRatio of the variator 20 and a speed ratio subRatio of the sub-transmission mechanism 30, hereinafter referred to as a "through speed ratio Ratio").

In this shift map, similarly to a shift map of a conventional belt continuously variable transmission, a shift line is set for each accelerator position APO and the automatic transmission 4 is shifted in accordance with the shift line selected according to the accelerator position APO. It should be noted that, only a full load line F/L (shift line when the accelerator position APO=8/8), a partial line P/L (shift line when the accelerator position APO=4/8) and a coast line C/L (shift line when the accelerator position APO=0) are shown in FIG. 3 for simplification.

When being in the low speed mode, the automatic transmission 4 can be shifted between a low speed mode lowest line LL/L obtained by maximizing the speed ratio vRatio of the variator 20 and a low speed mode highest line LH/L obtained by minimizing the speed ratio vRatio of the variator 20. At this time, the operating point of the automatic transmission 4 moves in regions A and B. On the other hand, when being in the high speed mode, the automatic transmission 4 can be shifted between a high speed mode lowest line HL/L obtained by maximizing the speed ratio vRatio of the variator 20 and a high speed mode highest line HH/L obtained by minimizing the speed ratio vRatio of the variator 20. At this time, the operating point of the automatic transmission 4 moves in regions B and C.

The speed ratio in each gear position of the sub-transmission mechanism 30 is set such that a speed ratio corresponding to the low speed mode highest line LH/L (low speed mode highest speed ratio) is smaller than a speed ratio corresponding to the high speed mode lowest line HL/L (high speed mode lowest speed ratio). In this way, a low speed mode ratio coverage LRE, which is a coverage of the through speed ratio Ratio of the automatic transmission 4 possible in the low speed mode, and a high speed mode ratio coverage HRE, which is a coverage of the through speed ratio Ratio of the automatic transmission 4 possible in the high speed mode, partially overlap. When the operating point of the automatic transmission 4 is in the region B (overlapping region) sandwiched between the high speed mode lowest line HL/L and the low speed mode highest line LH/L, the automatic transmission 4 can be selected to be both in the low speed mode and in the high speed mode.

The transmission controller 12 refers to this shift map and sets the through speed ratio Ratio corresponding to the vehicle speed VSP and the accelerator position APO (driving state of the vehicle) as a destination through speed ratio Dratio. This destination through speed ratio Dratio is a target value to be finally reached by the through speed ratio Ratio in this driving state. Then, the transmission controller 12 sets a target through speed ratio tRatio, which is a transient target value for the through speed ratio Ratio to follow the destination through speed ratio Dratio with a desired response characteristic, and controls the variator 20 and the sub-transmission mechanism 30 such that the through speed ratio Ratio matches the target through speed ratio tRatio.

On the shift map, a mode switch up-shift line MU/L for up-shifting the sub-transmission mechanism 30 (1→2 up-shift line of the sub-transmission mechanism 30) is set to substantially overlap on the low speed mode highest line LH/L. The through speed ratio Ratio corresponding to the mode switch up-shift line MU/L is substantially equal to the low speed mode highest line LH/L (low speed mode highest speed ratio). Further, on the shift map, a mode switch down-shift line MD/L for down-shifting the sub-transmission mechanism 30 (2→1 down-shift line of the sub-transmission mechanism 30) is set to substantially overlap on the high speed mode lowest line HL/L. The through speed ratio Ratio corresponding to the mode switch down-shift line MD/L is substantially equal to the high speed mode lowest speed ratio (high speed mode lowest line HL/L).

When the operating point of the automatic transmission 4 crosses the mode switch up-shift line MU/L or the mode switch down-shift line MD/L, i.e. the target through speed ratio tRatio of the automatic transmission 4 changes over a mode switch speed ratio mRatio or matches the mode switch speed ratio mRatio, the transmission controller 12 executes a mode switch shift control. In this mode switch shift control, the transmission controller 12 executes a "coordinated control" of coordinating two shifts by shifting the sub-transmission mechanism 30 and changing the speed ratio vRatio of the variator 20 in a direction opposite to a direction in which the speed ratio subRatio of the sub-transmission mechanism 30 changes.

In the "coordinated control", when the target through speed ratio tRatio of the automatic transmission 4 crosses the mode switch up-shift line MU/L from the region B toward the region C or matches the mode switch up-shift line MU/L from the side of the region B, the transmission controller 12 issues 1→52 up-shift determination, changes the gear position of the sub-transmission mechanism 30 from the first gear position to the second gear position and changes the speed ratio vRatio of the variator 20 from a highest speed ratio to a low speed ratio. Conversely, when the target through speed ratio tRatio of the automatic transmission 4 crosses the mode switch down-shift line MD/L from the region B toward the region A or matches the mode switch down-shift line MD/L from the side of the region B, the transmission controller 12 issues 2→1 down-shift determination, changes the gear position of the sub-transmission mechanism 30 from the second gear position to the first gear position and changes the speed ratio vRatio of the variator 20 from a lowest speed ratio to a high speed ratio side.

The "coordinated control" for changing the speed ratio vRatio of the variator 20 in mode switch up-shifting or mode switch down-shifting is executed because a sense of incongruity of a driver associated with a change of the input revolution speed caused by a step of the through speed ratio Ratio of the automatic transmission 4 can be suppressed and a shift shock of the sub-transmission mechanism 30 can be alleviated.

[Sailing Stop Control Process Configuration]

Figure 4:
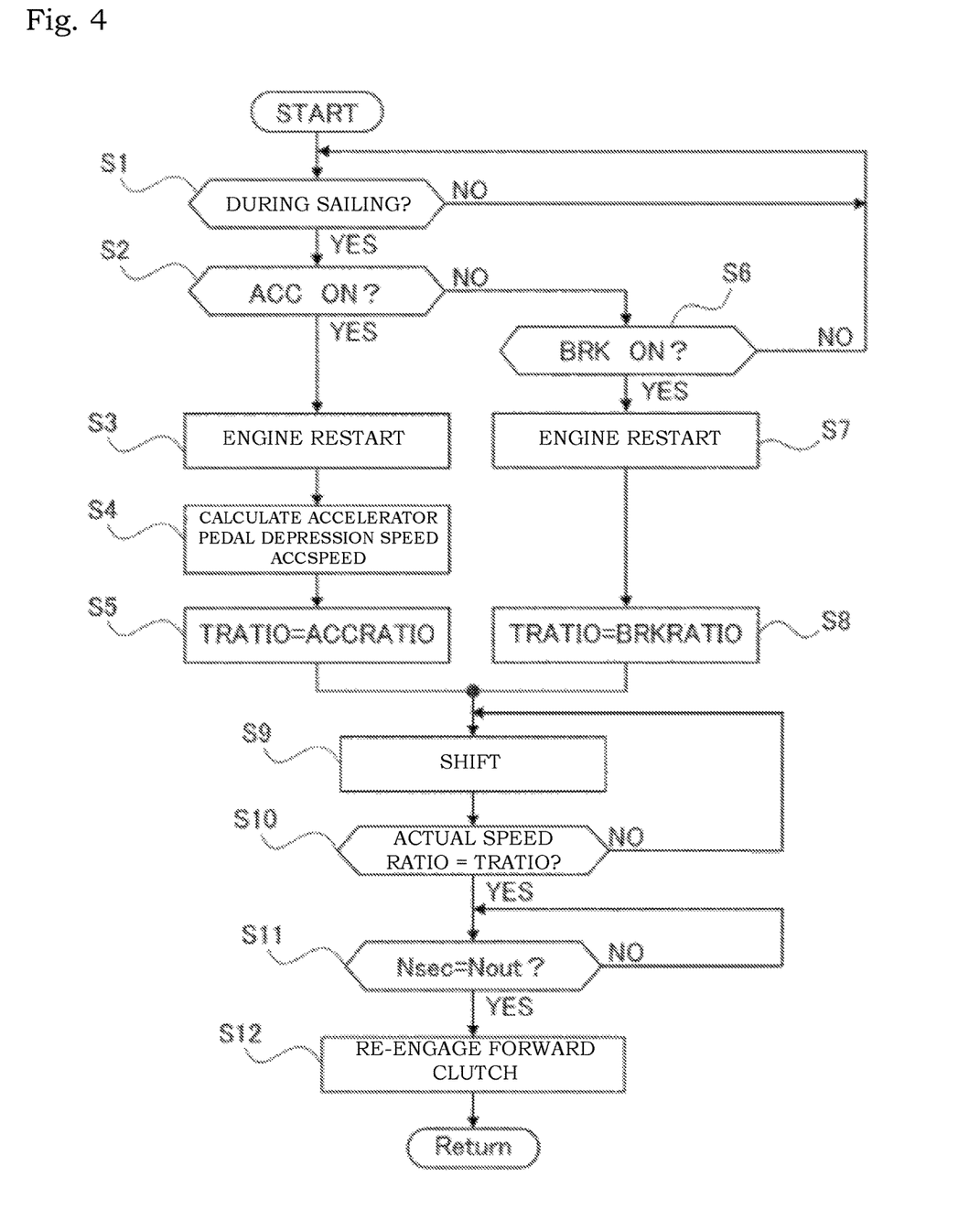
FIG. 4 is a flow chart showing a flow of a sailing stop control process performed by an integrated controller according to one or more embodiments of the present invention.

FIG. 4 shows a flow of the sailing stop control process configuration performed by the integrated controller 13 according to one or more embodiments of the present invention (sailing stop control unit). Each step of FIG. 4 representing the sailing stop control process configuration is described below.

In Step S1, the forward clutch Fwd/C (low brake 32 and high clutch 33) is disengaged and whether or not the vehicle is coasting by the sailing stop control with the engine 1 stopped is judged. Advance is made to Step S2 if YES (during sailing), whereas judgement in Step S1 is repeated if NO (not during sailing).

In Step S2, whether or not an accelerator pedal depression condition (accelerator ON condition), which is one of sailing exit conditions, has been satisfied is judged, following judgment in Step S1 that the vehicle is sailing. Advance is made to Step S3 if YES (accelerator ON condition satisfied), whereas advance is made to Step S6 if NO (accelerator ON condition not satisfied). Here, the "accelerator ON condition" is judged on the basis of a sensor signal from the accelerator position sensor 41 or an idle switch signal.

In Step S3, an engine restart is started to restart the engine 1 in a stopped state by the starter motor 15, following judgment in Step S2 that the accelerator ON condition has been satisfied, and advance is made to Step S4.

In Step S4, an accelerator pedal depression speed ACCSPEED is calculated, following the engine restart in Step S3, and advance is made to Step S5.

Here, the "accelerator pedal depression speed ACCSPEED" is obtained by performing a time differential operation of obtaining an accelerator position change amount over a fixed time on the basis of a sensor value from the accelerator position sensor 41 input in a predetermined cycle.

In Step S5, an accelerator corresponding speed ratio ACCRATIO is determined on the basis of the accelerator pedal depression speed ACCSPEED, following the calculation of the accelerator pedal depression speed ACCSPEED in Step S4, a target speed ratio TRATIO is set to the determined accelerator corresponding speed ratio ACCRATIO and advance is made to Step S9.

Here, the target speed ratio TRATIO after the engine restart upon satisfaction of the sailing exit condition is set to execute a shift control of the variator 20 having a speed ratio smaller than a coasting speed ratio in normal time. That is, the target speed ratio TRATIO is set to set a synchronous target engine revolution speed in a low (Lo) to high (Hi) region in which the primary revolution speed Npri is lower than a coast revolution speed (broken line characteristic) during coasting as shown in a hatched region of FIG. 5. It should be noted that if the primary revolution speed Npri is made lower than the coasting revolution speed when the vehicle speed VSP is equal, the speed ratio becomes smaller than the coasting speed ratio.

Figure 6:
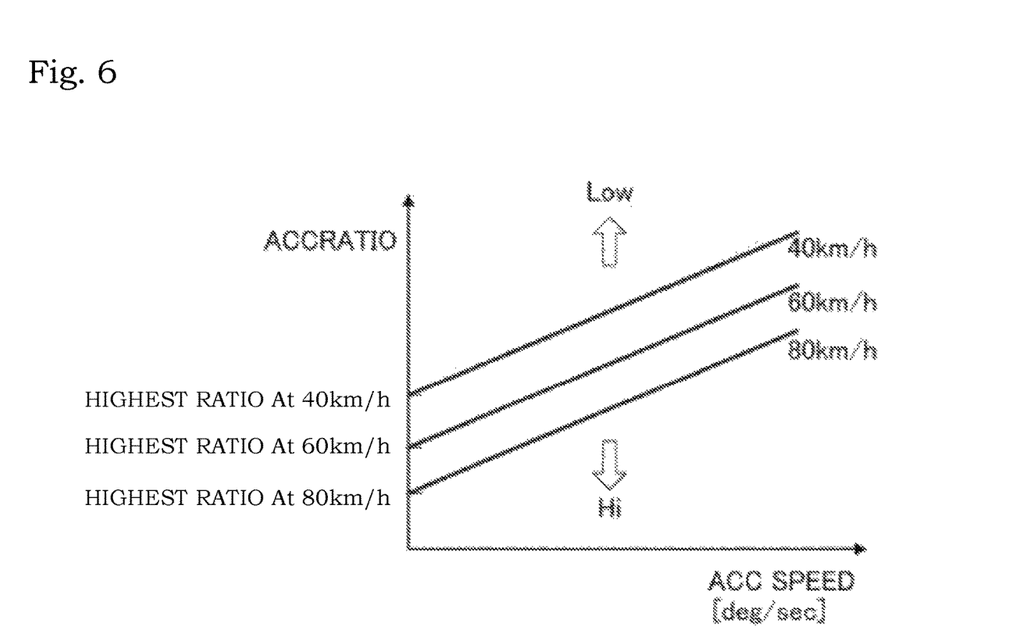
FIG. 6 is a diagram showing an example of an accelerator corresponding speed ratio determination map for determining a target speed ratio (accelerator corresponding speed ratio) according to an accelerator pedal depression speed and a vehicle speed in the shift control after the restart of the engine upon satisfaction of the sailing exit condition.

In executing the shift control of the variator 20, the target speed ratio TRATIO (=accelerator corresponding speed ratio ACCRATIO) is set on the basis of power performance if the sailing exit condition is an accelerator pedal depressing operation. Specifically, as shown in FIG. 6, the accelerator corresponding speed ratio ACCRATIO is changed toward a low speed ratio side due to a high power performance request as the accelerator pedal depression speed ACCSPEED increases, and changed toward a high speed ratio side due to a low power performance request as the vehicle speed VSP increases.

In Step S6, whether or not a brake pedal depression condition (brake ON condition), which is one of the sailing exit conditions, has been satisfied is judged, following judgment in Step S2 that the accelerator ON condition has not been satisfied. Advance is made to Step S7 if YES (brake ON condition satisfied), whereas return is made to Step S1 if NO (brake ON condition not satisfied).

Here, the "brake ON condition" is judged on the basis of a switch signal from the brake switch 46.

In Step S7, the engine restart of restarting the engine 1 in the stopped state by the starter motor 15 is started, following judgment in Step S6 that the brake ON condition is satisfied, and advance is made to Step S8.

In Step S8, a brake corresponding speed ratio BRKRATIO is determined, following the engine restart in Step S7, the target speed ratio TRATIO is set to the determined brake corresponding speed ratio BRKRATIO and advance is made to Step S9.

Here, as in the case of satisfaction of the accelerator ON condition, the target speed ratio TRATIO after the engine restart upon satisfaction of the sailing exit condition is set to execute the shift control of the variator 20 having a smaller speed ratio than the coasting speed ratio in normal time. That is, the target speed ratio TRATIO is set to set the synchronous target engine revolution speed in the hatched region of FIG. 5.

If the sailing exit condition is a brake pedal depressing operation in executing the shift control of the variator 20, the target speed ratio TRATIO (=brake corresponding speed ratio BRKRATIO) is set on the basis of engine exhaust performance. Specifically, the target speed ratio TRATIO is set to a highest speed ratio of the variator 20. Alternatively, the target speed ratio TRATIO is set to a highest speed ratio corresponding to the vehicle speed VSP when the accelerator pedal depression speed ACCSPEED shown in FIG. 6 is zero.

In Step S9, a shift control is executed to match an actual speed ratio of the variator 20, which is the coasting speed ratio at the start of the control, with the target speed ratio TRATIO, following the setting of the target speed ratio TRATIO in Step S5 or S8 or judgment in Step S10 that the actual speed ratio≠TRATIO, and advance is made to Step S10.

In Step S10, whether or not the actual speed ratio of the variator 20 has been matched with the target speed ratio TRATIO is judged, following the shift control in Step S9. Advance is made to Step S11 if YES (actual speed ratio=TRATIO), whereas return is made to Step S9 if NO (actual speed ratio≠TRATIO).

Here, the "actual speed ratio" is obtained from the primary revolution speed Npri from the primary revolution speed sensor 42 for detecting the input revolution speed of the variator 20 and the second revolution speed Nsec from the secondary revolution speed sensor 49 for detecting the output revolution speed of the variator 20.

In Step S11, whether or not the secondary revolution speed Nsec, which is the input revolution speed of the forward clutch Fwd/C, and the output revolution speed Nout (=vehicle speed VSP) of the forward clutch Fwd/C are in a rotation synchronous state is judged, following judgment in Step S10 that the actual speed ratio=TRATIO or judgement in Step S11 that Nsec≠Nout. Advance is made to Step S12 if YES (Nsec=Nout), whereas judgment in Step S11 is repeated if NO (Nsec≠Nout).

Here, information on the secondary revolution speed Nsec of the variator 20 is obtained from the secondary revolution speed sensor 49, and information on the output revolution speed Nout of the automatic transmission 4 is obtained by the vehicle speed sensor 43. In the rotation synchronization control, the secondary revolution speed Nsec of the variator 20 is increased to approach the output revolution speed Nout by increasing the revolution speed of the restarted engine 1. It should be noted that, in Step S11, a synchronization determination threshold value may be used and affirmative judgment may be made if Nout-Nsec ≤synchronization determination threshold value.

In Step S12, the forward clutch Fwd/C (low brake 32 or high clutch 33) in the disengaged state is re-engaged, following judgment in Step S11 that Nsec=Nout (rotation synchronous state), and this flow returns.

Next, functions are described.

Functions of the sailing stop control device for the engine vehicle according to one or more embodiments of the present invention are described separately for "sailing stop control process functions", "sailing stop control functions" and "characteristic functions of the sailing stop control method".

[Sailing Stop Control Process Functions]

The sailing stop control process functions according to one or more embodiments of the present invention are described on the basis of the flow chart shown in FIG. 4.

If the accelerator pedal depressing operation is performed during coasting by the sailing stop control, the process proceeds in the order of Step S1→Step S2→Step S3→Step S4→Step S5→Step S9→Step S10 in the flow chart of FIG. 4. In Step S3, the engine 1 in the stopped state is restarted by the starter motor 15. In Step S4, the accelerator pedal depression speed ACCSPEED is calculated. In Step S5, the accelerator corresponding speed ratio ACCRATIO is determined on the basis of the accelerator pedal depression speed ACCSPEED, and the target speed ratio TRATIO is set to the determined accelerator corresponding speed ratio ACCRATIO. While it is judged in Step S10 that the actual speed ratio≠TRATIO, the shift control is executed to match the actual speed ratio of the variator 20, which is the coasting speed ratio at the start of the control, with the target speed ratio TRATIO (=accelerator corresponding speed ratio ACCRATIO) in Step S9.

Thereafter, when it is judged in Step S10 that the actual speed ratio=TRATIO, advance is made from Step S10 to Step S11. In Step S11, whether or not the secondary revolution speed Nsec, which is the input revolution speed of the forward clutch Fwd/C, and the output revolution speed Nout (=vehicle speed VSP) of the forward clutch Fwd/C are in the rotation synchronous state is judged. Advance is made to Step S12 if it is judged in Step S11 that Nsec=Nout, and the forward clutch Fwd/C (low brake 32 or high clutch 33) in the disengaged state is re-engaged in Step S12.

On the other hand, if the brake pedal depressing operation is performed during coasting by the sailing stop control, the process proceeds in the order of Step S1→Step S2→Step S6→Step S7→Step S8→Step S9→Step S10 in the flow chart of FIG. 4. In Step S7, the engine 1 in the stopped state is restarted by the starter motor 15. In Step S8, the brake corresponding speed ratio BRKRATIO is determined, and the target speed ratio TRATIO is set to the determined brake corresponding speed ratio BRKRATIO. While it is judged in Step S10 that the actual speed ratio≠TRATIO, the shift control is executed to match the actual speed ratio of the variator 20, which is the coasting speed ratio at the start of the control, with the target speed ratio TRATIO (=brake corresponding speed ratio BRKRATIO) in Step S9.

Thereafter, when it is judged in Step S10 that the actual speed ratio =TRATIO, advance is made from Step S10 to Step S11. In Step S11, whether or not the secondary revolution speed Nsec, which is the input revolution speed of the forward clutch Fwd/C, and the output revolution speed Nout (=vehicle speed VSP) of the forward clutch Fwd/C are in the rotation synchronous state is judged. Advance is made to Step S12 if it is judged in Step S11 that Nsec=Nout, and the forward clutch Fwd/C (low brake 32 or high clutch 33) in the disengaged state is re-engaged in Step S12.

As just described, if the sailing exit condition is satisfied, the shift control is executed to change the speed of the variator 20 in an up-shifting direction after the engine restart and, thereafter, a process is performed to re-engage the forward clutch Fwd/C after the rotation synchronization control. At this time, the setting of the target speed ratio TRATIO in the shift control for changing the speed in the up-shifting direction is made different in the case where the accelerator pedal depressing operation condition is satisfied and in the case where the brake pedal depressing operation condition is satisfied, the accelerator pedal depressing operation condition and the brake pedal depressing operation condition being both the sailing exit conditions. That is, the target speed ratio TRATIO is set to the accelerator corresponding speed ratio ACCRATIO satisfying the power performance in the case where the accelerator pedal depressing operation condition is satisfied, and the target speed ratio TRATIO is set to the brake corresponding speed ratio BRKRATIO satisfying the engine exhaust performance in the case where the brake pedal depressing operation condition is satisfied.

[Sailing Stop Control Functions]

The sailing stop control aims to disengage the forward clutch Fwd/C for transmitting power from the engine 1 of the CVT (power transmission mechanism) when the accelerator pedal is released regardless of a vehicle speed range during travel. In this way, the engine 1 and the drive wheels 7 are separated, a free running distance when the accelerator pedal is released increases by preventing deceleration due to engine braking, with the result that fuel economy is improved. Further, fuel for maintaining idling is also saved by stopping the engine 1.

However, in a scene where the engine 1 is restarted to return from coasting with the engine 1 stopped, rotation synchronization is performed to alleviate a shock at the time of engaging the forward clutch Fwd/C. In this rotation synchronization, the engine 1 performs rotation synchronization at a fully open torque to suppress response deterioration to a minimum level, but engine exhaust is deteriorated by starting the engine 1 up to a high revolution speed at the fully open torque.

Figure 7:
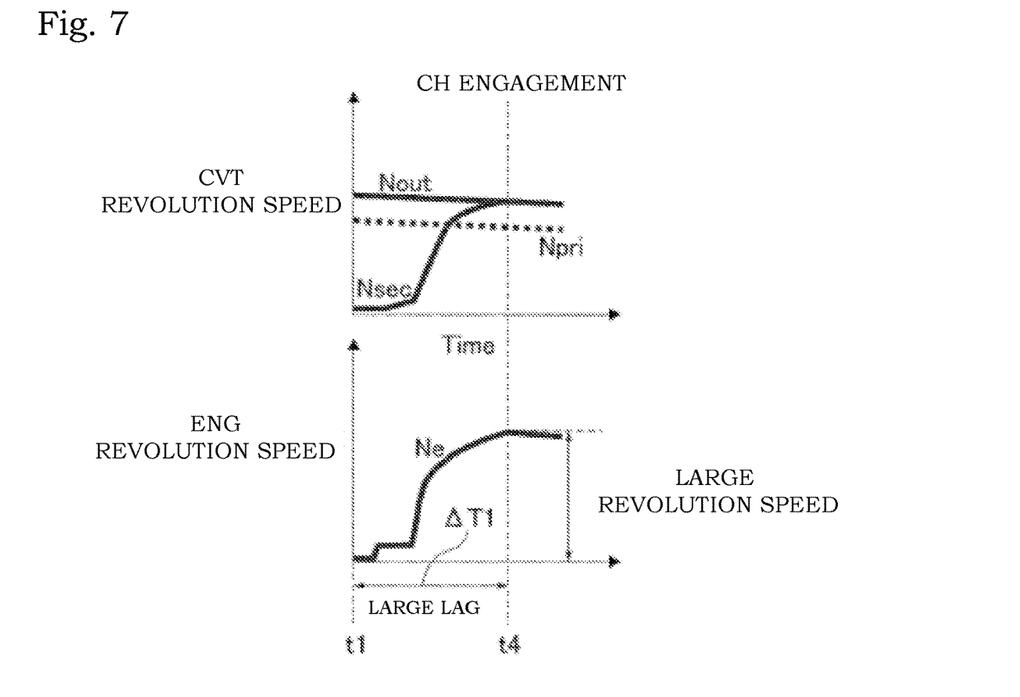
FIG. 7 is a time chart showing characteristics including a transmission output revolution speed Nout (=vehicle speed VSP), a primary revolution speed Npri, a secondary revolution speed Nsec and an engine revolution speed Ne from the satisfaction of the sailing exit condition to the re-engagement of a forward clutch in a comparative example.
Figure 8:
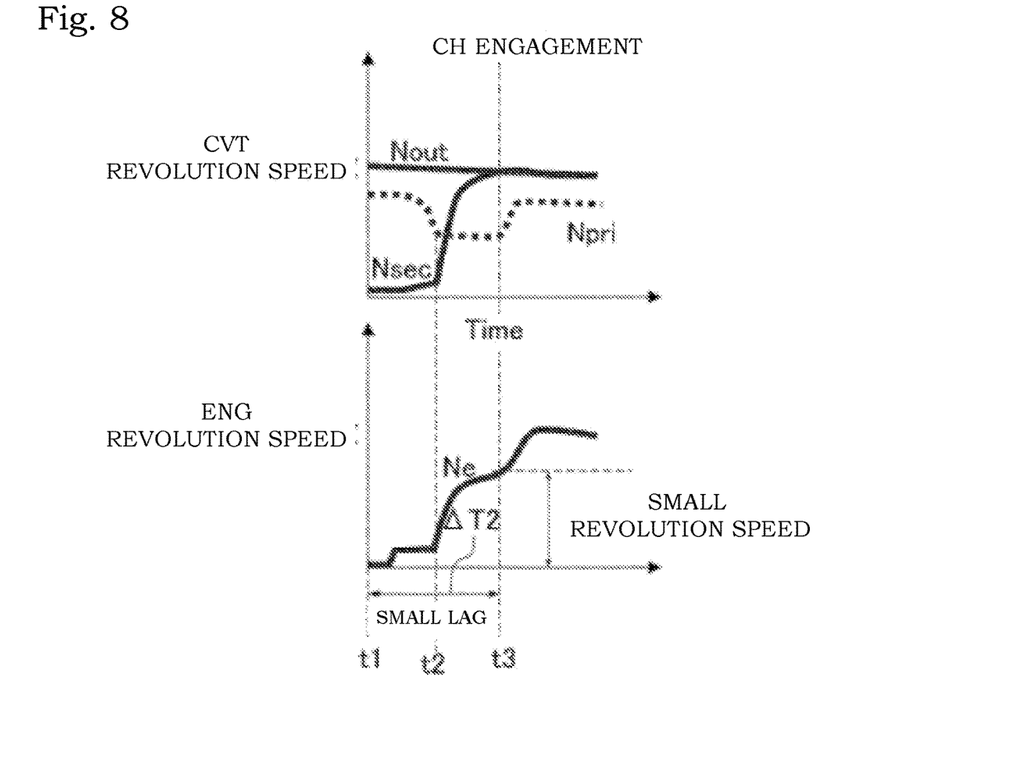
FIG. 8 is a time chart showing characteristics including a transmission output revolution speed Nout (=vehicle speed VSP), a primary revolution speed Npri, a secondary revolution speed Nsec and an engine revolution speed Ne from the satisfaction of the sailing exit condition to the re-engagement of a forward clutch in one or more embodiments of the present invention.

The sailing stop control functions according to one or more embodiments of the present invention for realizing the aim of the sailing stop control and shortening a lag time until an initial acceleration/deceleration is reached while reducing the deterioration of the engine exhaust when return is made after the sailing exit condition is satisfied are described on the basis of time charts shown in FIGS. 7 and 8 while a comparative example (without the shift control) and the embodiment (with the shift control) are compared.

It should be noted that, in FIGS. 7 and 8, time t1 is a sailing exit condition satisfied time, time t2 is a shift end time according to one or more embodiments of the present invention, time t3 is a forward clutch re-engagement start time according to one or more embodiments of the present invention and time t4 is a forward clutch re-engagement start time in the comparative example.

In the case of the comparative example, a speed ratio of a variator is fixed at a coasting speed ratio between time t1 and time t4 as is clear from characteristics of the output revolution speed Nout and the primary revolution speed Npri shown in FIG. 7. Accordingly, when time t1 at which the sailing exit condition is satisfied is reached and an engine is restarted, an engine revolution speed Ne increases and a secondary revolution speed Nsec increases according to the coasting speed ratio of the variator as the engine revolution speed Ne increases. When time t4 at which the secondary revolution speed Nsec matches the output revolution speed Nout is reached, a forward clutch is re-engaged in the comparative example.

In contrast, according to one or more embodiments of the present invention, when the sailing exit condition is satisfied at time t1, the engine restart is started and the shift control in the up-shifting direction is started. When the shift control is finished by ensuring the pump discharged oil by an increase of the engine revolution speed at time t2, the primary revolution speed Npri decreases. Thus, the secondary revolution speed Nsec increases according to an increase of the engine revolution speed Ne and the speed ratio of the variator 20 (speed ratio higher than the coasting speed ratio) from time t2. When time t3 at which the secondary revolution speed Nsec matches the output revolution speed Nout is reached, an arrival point of the engine revolution speed Ne becomes lower than in the comparative example and the forward clutch Fwd/C in one or more embodiments of the present invention is re-engaged.

As just described, a lag time $\Delta T2$ ($<\Delta T1$) from the sailing exit condition satisfying time t1 to the forward clutch re-engagement start time t3 in one or more embodiments of the present invention corresponds to the low primary revolution speed Npri due to the speed ratio higher than the coasting speed ratio and becomes shorter (small lag) since the engine revolution speed Ne only has to increase to a synchronization target engine revolution speed in a revolution speed range lower than in the comparative example. In contrast, in the case of the comparative example, a lag time $\Delta T1$ from the sailing exit condition satisfying time t1 to the forward clutch re-engagement start time t4 corresponds to the high primary revolution speed Npri due to the coasting speed ratio and becomes longer (large lag) since the engine revolution speed Ne increases to reach a high revolution speed. As a result, according to one or more embodiments of the present invention, the lag time from the satisfaction of the sailing exit condition to the start of the re-engagement of the forward clutch Fwd/C is shortened by ($\Delta T1-\Delta T2$) as compared to the comparative example.

[Characteristic Functions of Sailing Stop Control Method]

In one or more embodiments of the present invention, when the sailing exit condition is satisfied and the engine 1 is restarted during coasting by the sailing stop control, the shift control is executed to set the speed ratio of the variator 20 to a speed ratio smaller than the coasting speed ratio in normal time before the rotation synchronization of the forward clutch Fwd/C.

Specifically, a shift in the up-shifting direction at the speed ratio smaller than the coasting speed ratio is a shift to reduce the primary revolution speed Npri if the secondary revolution speed Nsec (vehicle speed VSP) is constant. Thus, at a timing at which the engine revolution speed Ne of the engine 1 arranged at an input side of the variator 20 increases to a revolution speed lower than that at the coasting speed ratio, the input and output revolution speeds of the forward clutch Fwd/C are determined to be a synchronous revolution speed. Thus, engine exhaust deterioration (exhaust amount of HC) is reduced by decreasing an intake air amount of the engine 1 restarted upon satisfaction of the sailing exit condition. In addition, since the engine revolution speed Ne at which the forward clutch Fwd/C reaches the synchronous revolution speed is a revolution speed lower than that at the coasting speed ratio, the forward clutch Fwd/C is re-engaged at an earlier timing and the lag time (response) until an initial acceleration/deceleration is reached is shortened.

As a result, the lag time until the initial acceleration/deceleration is reached is shortened while the deterioration of engine exhaust is reduced when return is made after the sailing exit condition is satisfied. It should be noted that the lag time until the initial acceleration is reached is shortened if the sailing exit condition is satisfied by the accelerator ON operation, and the lag time until the initial deceleration is reached is shortened if the sailing exit condition is satisfied by the brake ON operation.

In one or more embodiments of the present invention, the target speed ratio TRATIO is set to the highest speed ratio satisfying the power performance when the shift control of the variator 20 is executed after the restart of the engine 1.

For example, if the target speed ratio TRATIO is set to the highest speed ratio, an effect of reducing the deterioration of engine exhaust can be enhanced. However, if the target speed ratio TRATIO is set to the highest speed ratio, a power performance request by the accelerator pedal depressing operation may not be met.

Accordingly, by setting the highest speed ratio satisfying the power performance, exhaust deterioration and response deterioration are reduced while the power performance is satisfied.

In one or more embodiments of the present invention, in executing the shift control of the variator 20 after the restart of the engine, the target speed ratio TRATIO is set on the basis of the power performance when the sailing exit condition is the accelerator pedal depressing operation. The target speed ratio TRATIO is set on the basis of the engine exhaust performance when the sailing exit condition is the brake pedal depressing operation.

Specifically, a power performance request is given at the time of the accelerator pedal depressing operation, but no power performance request is given at the time of the brake pedal depressing operation since a transition is made to vehicle deceleration thereafter.

Accordingly, by changing the target speed ratio TRATIO depending on the presence or absence of the power performance request, both the achievement of the power performance request at the time of the accelerator pedal depressing operation and a reduction of engine exhaust deterioration at the time of the brake pedal depressing operation are realized.

In one or more embodiments of the present invention, the target speed ratio TRATIO is changed to the low speed ratio side as the accelerator pedal depression speed ACCSPEED increases when the sailing exit condition is the accelerator pedal depressing operation.

Specifically, if the same accelerator pedal depressing operation is performed, the power performance request of the driver is low if the accelerator pedal depression speed ACCSPEED is low and the power performance request of the driver is high if the accelerator pedal depression speed ACCSPEED is high. Further, the power performance becomes higher as the speed ratio of the variator 20 decreases.

Accordingly, by decreasing the target speed ratio TRATIO as the accelerator pedal depression speed ACCSPEED increases, the power performance request of the driver is met while the deterioration of engine exhaust is suppressed to a minimum level.

In the sailing stop control method and control device for the engine vehicle according to one or more embodiments of the present invention, one or more of the effects listed below may be obtained.

(1) The transmission (variator 20) and the friction engaging element (forward clutch Fwd/C) are provided which are arranged in series between the engine 1 and the drive wheels 7.

The sailing stop control is executed to coast by shutting off power transmission by the friction engaging element (forward clutch Fwd/C) and stopping the engine 1 on the basis of satisfaction of the sailing exit condition.

In this vehicle (engine vehicle), if the sailing exit condition is satisfied during coasting by the sailing stop control, the engine 1 is restarted.

After the restart of the engine 1, the shift control is executed to set the speed ratio of the transmission (variator 20) to the speed ratio smaller than the coasting speed ratio.

If the input and output revolution speeds of the friction engaging element (forward clutch Fwd/C) are determined to be the synchronous revolution speed after the end of the shift control of the transmission (variator 20), the friction engaging element (forward clutch Fwd/C) is re-engaged (FIG. 4).

Thus, it is possible to provide the sailing stop control method for vehicle (engine vehicle) which shortens the lag time until the initial acceleration/deceleration is reached while reducing the deterioration of engine exhaust when return is made after the sailing exit condition is satisfied.

Figure 5:
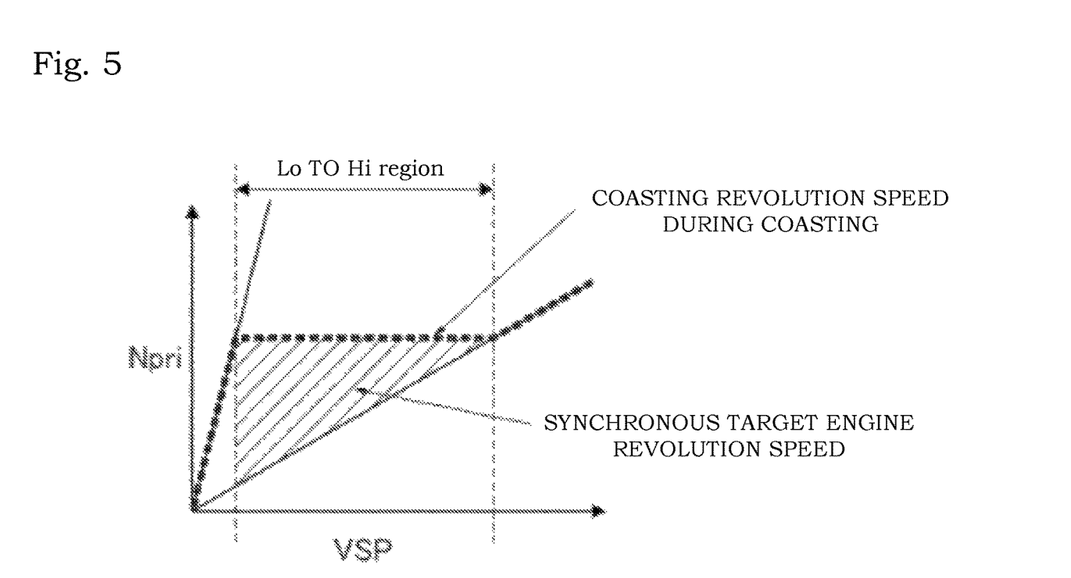
FIG. 5 is a shift map diagram showing a region where a target speed ratio is set in a shift control after the restart of an engine upon satisfaction of a sailing exit condition.

(2) The target speed ratio TRATIO is set to the highest speed ratio satisfying the power performance when the shift control of the transmission (variator 20) is executed after the restart of the engine 1 (FIG. 5).

Thus, in addition to the effect of (1), exhaust deterioration and response deterioration can be reduced while the power performance is satisfied by setting the highest speed ratio satisfying the power performance.

(3) In executing the shift control of the transmission (variator 20) after the restart of the engine, the target speed ratio TRATIO is set on the basis of the power performance when the sailing exit condition is the accelerator pedal depressing operation (S5 of FIG. 4). The target speed ratio TRATIO is set on the basis of the engine exhaust performance when the sailing exit condition is the brake pedal depressing operation (S8 of FIG. 4).

Thus, in addition to the effect of (1) or (2), both the achievement of the power performance at the time of the accelerator pedal depressing operation and a reduction of the engine exhaust deterioration at the time of the brake pedal depressing operation can be realized by changing the target speed ratio TRATIO depending on the presence or absence of the power performance request.

(4) If the sailing exit condition is the accelerator pedal depressing operation, the target speed ratio TRATIO is changed to the low speed ratio side as the accelerator pedal depression speed ACCSPEED increases (FIG. 6).

Thus, in addition to the effect of (3), the power performance request of the driver can be met while the engine exhaust deterioration is suppressed to a minimum level by changing the target speed ratio TRATIO to the low speed ratio side as the accelerator pedal depression speed ACCSPEED increases.

(5) The engine 1, the transmission (variator 20), the friction engaging element (forward clutch Fwd/C) and the drive wheels 7 are provided.

The sailing stop control unit (integrated controller 13) is provided which executes the sailing stop control to coast by shutting off power transmission by the friction engaging element (forward clutch Fwd/C) and stopping the engine 1 on the basis of satisfaction of the sailing exit condition.

In this vehicle (engine vehicle), the sailing stop control unit (integrated controller 13) restarts the engine 1 upon satisfaction of the sailing exit condition during coasting by the sailing stop control.

After the restart of the engine 1, the shift control is executed to set the speed ratio of the transmission (variator 20) to the speed ratio smaller than the coasting speed ratio in normal time.

If the input and output revolution speeds of the friction engaging element (forward clutch Fwd/C) are determined to be the synchronous revolution speed after the end of the shift control of the transmission (variator 20), the friction engaging element (forward clutch Fwd/C) is re-engaged (FIG. 4).

Thus, it is possible to provide the sailing stop control device for vehicle (engine vehicle) which shortens the lag time until the initial acceleration/deceleration is reached while reducing the deterioration of engine exhaust when return is made after the sailing exit condition is satisfied.

Although the sailing stop control method and control device for vehicle have been described with the embodiments above, a specific configuration is not limited to the above embodiments and design changes, addition and the like are allowed unless departing from the gist of the invention according to each claim.

In one or more of the above embodiments, the use of the forward clutch Fwd/C arranged downstream of the variator 20 serving as the transmission is illustrated as the friction engaging element. However, a forward clutch arranged upstream of a variator serving as a transmission may be used as the friction engaging element.

In one or more of the above embodiments, the sailing stop control method and control device for vehicle of the present invention are applied to the engine vehicle mounted with the continuously variable transmission equipped with the sub-transmission. However, the sailing stop control method and control device for vehicle according to one or more embodiments of the present invention may be applied to engine vehicles mounted with a continuously variable transmission, engine vehicles mounted with a stepped transmission and the like. In short, application is possible if a vehicle includes an engine, drive wheels, a transmission and a friction engaging element and executes a sailing stop control.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A sailing stop control method for a vehicle including a transmission and a friction engaging element arranged in series between an engine and drive wheels, comprising:
    performing a sailing stop control to coast by shutting off power transmission by the friction engaging element;
    stopping the engine based on satisfaction of a sailing enter condition;
    restarting the engine upon satisfaction of a sailing exit condition during coasting by the sailing stop control;
    determining if the sailing exit condition is a brake petal depressing operation;
    if the sailing exit condition is a brake petal depressing operation, executing a shift control to set a target speed ratio of the transmission to a highest speed ratio in a speed ratio region smaller than a coasting speed ratio during the coasting, the highest speed ratio satisfying engine exhaust performance after the restart of the engine;
    determining, after an end of the shift control of the transmission, if input and output revolution speeds of the friction engaging element are equal to a synchronous revolution speed, and
    if the input and output revolution speeds of the friction engaging element are equal to the synchronous revolution speed, re-engaging the friction engaging element.

2. The sailing stop control method for the vehicle according to claim 1, further comprising:
    determining if the sailing exit condition is an accelerator petal depressing condition;
    if the sailing exit condition is the accelerator petal depressing operation, executing a shift control to set the target speed ratio of the transmission after the restart of the engine based on power performance.

3. The sailing stop control method for the vehicle according to claim 2,
    wherein, if the sailing exit condition is the accelerator petal depressing operation, the target speed ratio of the transmission after the restart of the engine is changed toward a low speed ratio side as an accelerator pedal depression speed increases.

4. A sailing stop control device for a vehicle including an engine, a transmission, a friction engaging element, and, drive wheels, comprising:
    a sailing stop controller programmed to:
        execute a sailing stop control to coast by shutting off power transmission by the friction engaging element and stopping the engine based on satisfaction of a sailing enter condition,
        restart the engine upon satisfaction of a sailing exit condition during coasting by the sailing stop control,
        determine if the sailing exit condition is a brake petal depressing operation,
        if the sailing exit condition is a brake petal depressing operation, execute a shift control to set a target speed ratio of the transmission to a highest speed ratio in a speed ratio region smaller than a coasting speed ratio during the coasting, the highest speed ratio satisfying engine exhaust performance after the restart of the engine,
        determine, after an end of the shift control of the transmission, if input and output revolution speeds of the friction engaging element are equal to a synchronous revolution speed, and
        if the input and output revolution speeds of the friction engaging element are equal to the synchronous resolution speed, re-engage the friction engagement element.

* * * * *